UNITED STATES PATENT OFFICE.

WALTER PETHYBRIDGE, OF LONDON, ENGLAND.

PROCESS OF TREATING TELLURIDE GOLD ORES.

SPECIFICATION forming part of Letters Patent No. 709,038, dated September 16, 1902.

Application filed September 23, 1901. Serial No. 76,267. (No specimens.)

*To all whom it may concern:*

Be it known that I, WALTER PETHYBRIDGE, a subject of the King of Great Britain and Ireland, residing at London, England, have invented a new and useful Improvement in the Treatment of Telluride Gold Ores, (for which I have made application for Letters Patent in Great Britain under No. 4,375, bearing date March 1, 1901,) of which the following is a specification.

The processes hitherto proposed for the treatment of telluride gold ores have been open to various objections—viz., costliness of working, an unsatisfactory yield of gold, and a total loss of tellurium.

The object of my invention is to treat the said ores in an economical manner with the recovery of all or practically all the gold and tellurium contained therein.

According to my invention I subject the ore in a fine state of division to the action of a solution of ferric sulfate, preferably of a specific density of 1.27, at any suitable temperature; but the greater the degree of heat in the solution the more expeditiously will the process be effected. It is preferable to add the ore gradually to the solution, which should be continually agitated in vats or any other suitable containing vessels by stirrers or other means. The reaction is the formation of a soluble tellurium sulfate or a ferric tellurate soluble in the solution of ferric sulfate. By this means the telluride of gold is decomposed and the tellurium passes into solution, while the gold is left behind in a free or uncombined state. The residues are then separated from the solution by filtration or decantation, and after being thoroughly washed the said residues may be subjected to amalgamation, chlorination, or cyanidation for the recovery of the gold contained therein. The tellurium may be precipitated from the solution when necessary by boiling and the addition of metallic iron and afterward separated from the solution by filtration. The filtrate, consisting of ferrous sulfate, may be converted into ferric sulfate for further use upon fresh charges of ore by the addition of potassium chlorate preferably with nitric acid or by electrolysis. This reconversion may be represented by the following formula:

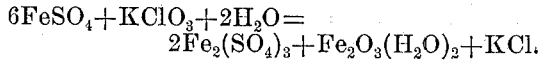

$$6FeSO_4 + KClO_3 + 2H_2O = 2Fe_2(SO_4)_3 + Fe_2O_3(H_2O)_2 + KCl.$$

Having now described my invention, what I claim, and desire to secure by Letters Patent, is—

1. A process for the decomposition of telluride of gold contained in ores, consisting in pulverizing the ore and treating the pulverized ore with a solution of ferric sulfate, used alone, resulting in the dissolving of the tellerium and the freeing of the gold in a solid form, substantially as described.

2. A process for the decomposition of telluride of gold contained in ores, consisting in pulverizing the ore and treating the pulverized ore with a solution of ferric sulfate, used alone, the separation of the filtrate, the precipitation of the tellurium by metallic iron and boiling, and the reconversion of the spent filtrate of ferrous sulfate into ferric sulfate by the action of potassium chlorate.

3. A process for the recovery of gold and tellurium from telluride of gold contained in ores, consisting in treating the pulverized ore with a solution of ferric sulfate, used alone; separating the filtrate from the solid residue; treating the residue for recovery of the free and solid gold therein, treating the filtrate for precipitation of the tellurium by metallic iron and boiling, separating the further filtrate of ferrous sulfate, and converting the ferrous sulfate into ferric sulfate by oxidation.

In witness whereof I have hereunto set my hand in presence of two witnesses.

WALTER PETHYBRIDGE.

Witnesses:
 JOHN C. FELL,
 RICHARD A. HOFFMANN.